Oct. 27, 1953
J. F. ROLLINS
2,657,121
CATALYTIC REACTOR
Filed Oct. 3, 1946
2 Sheets-Sheet 1
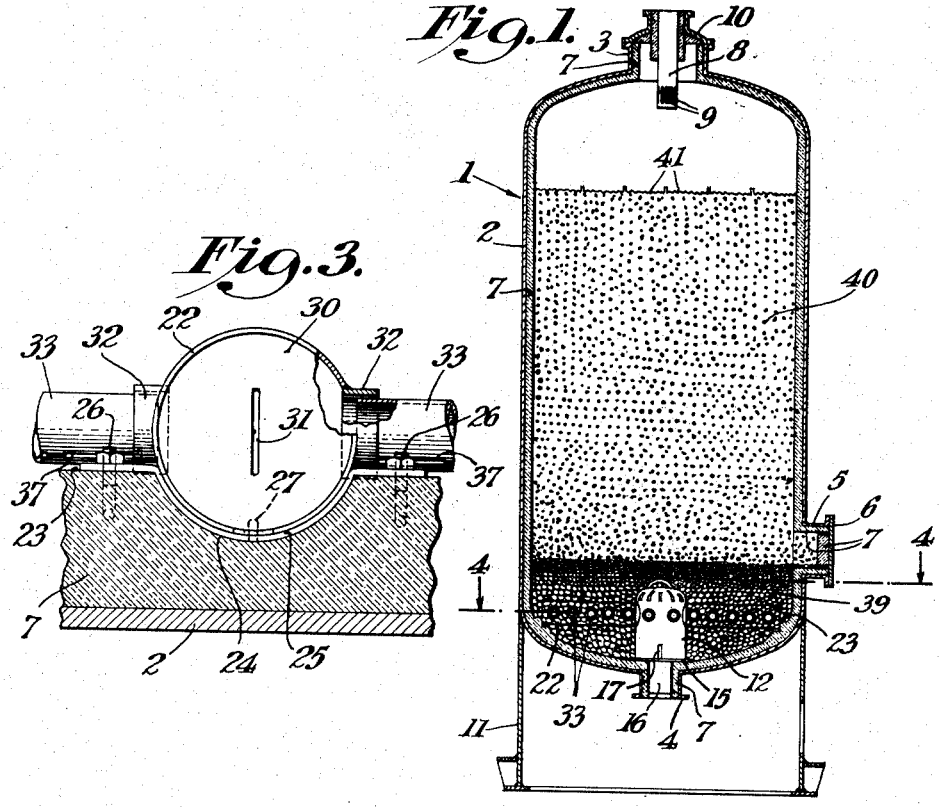
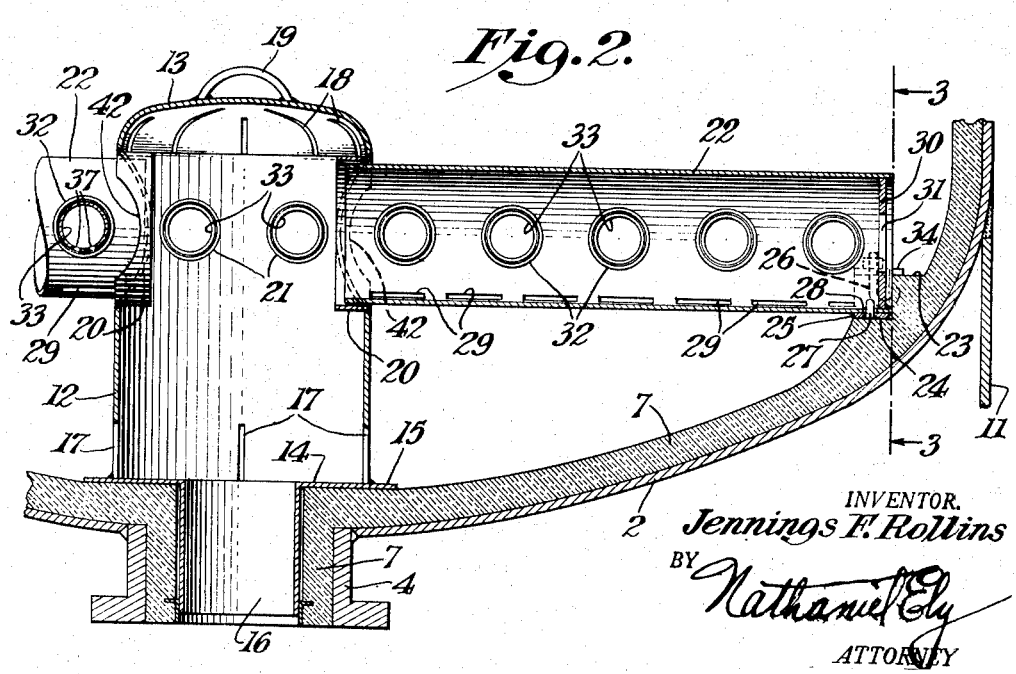
INVENTOR.
Jennings F. Rollins
BY
Nathaniel Ely
ATTORNEY INVENTOR.
Jennings F. Rollins
BY Nathaniel Ely
ATTORNEY Patented Oct. 27, 1953

2,657,121

UNITED STATES PATENT OFFICE 2,657,121

CATALYTIC REACTOR

Jennings F. Rollins, Westfield, N. J., assignor to The Lummus Company, New York, N. Y., a corporation of Delaware Application October 3, 1946, Serial No. 701,035

2 Claims. (Cl. 23—288)

This invention relates more particularly to improvements in means for collecting product vapors within a catalytic reactor and discharging the collected vapors from the reactor.

In many catalytic processes, such as one employed for desulfurization of a hydrocarbon charge, for example, the charge is passed downwardly through a large vertical casing containing a porous mass of solid catalyst in a divided state, and the product vapors of the reaction are collected from the bottom of said mass and discharged from the casing. In a large scale operation forty tons or more of catalyst may be employed. Heretofore the support of such a mass within the casing in a satisfactory manner presented a difficult engineering problem. It has been customary to impose the catalyst burden upon the means employed for collecting the product vapors. In that case, however, the collecting means must be of great mass and strength and under supports must be provided to transmit the great load of the catalyst and the added load of the collecting means to the reactor casing. The concentration of the load at the points of support imposes great strain upon the casing. In addition to that, transfer of heat through said supports to the casing becomes a serious factor. In a desulfurization process there is a temperature of from 700 to 800° F. within the casing and when the catalyst is undergoing regeneration within the casing an even greater temperature develops. In order to reduce transfer of heat through the supports to the casing to a safe limit, provision is made for circulating a cooling fluid in indirect heat exchange relation to the supports. The necessarily massive character of the collecting means and the provision of the required heat exchanger equipment for said cooling feature entail a cost of many thousands of dollars.

An important object of the present invention is to provide for support of the catalyst mass in a manner to relieve the collecting means of the burden, obtain a proper distribution of the load transmitted to the reactor casing and avoid the necessity of heat exchanger equipment to reduce transfer of heat to the casing.

A further object of the invention is to provide an improved collecting device designed to obtain the said advantages.

A still further object of the invention is to provide a collecting device designed to facilitate assembly and disassembly thereof within the reactor casing.

Further objects and advantages of the invention will appear from the following description taken in connection with the accompanying drawings.

In the drawings:

Fig. 1 is a vertical longitudinal sectional view of a reactor embodying the invention;

Fig. 2 is an enlarged vertical sectional view of a lower portion of the reactor with the mass of aggregate omitted;

Fig. 3 is a further enlarged detail section on the line 3—3 of Fig. 2;

Figure 4:
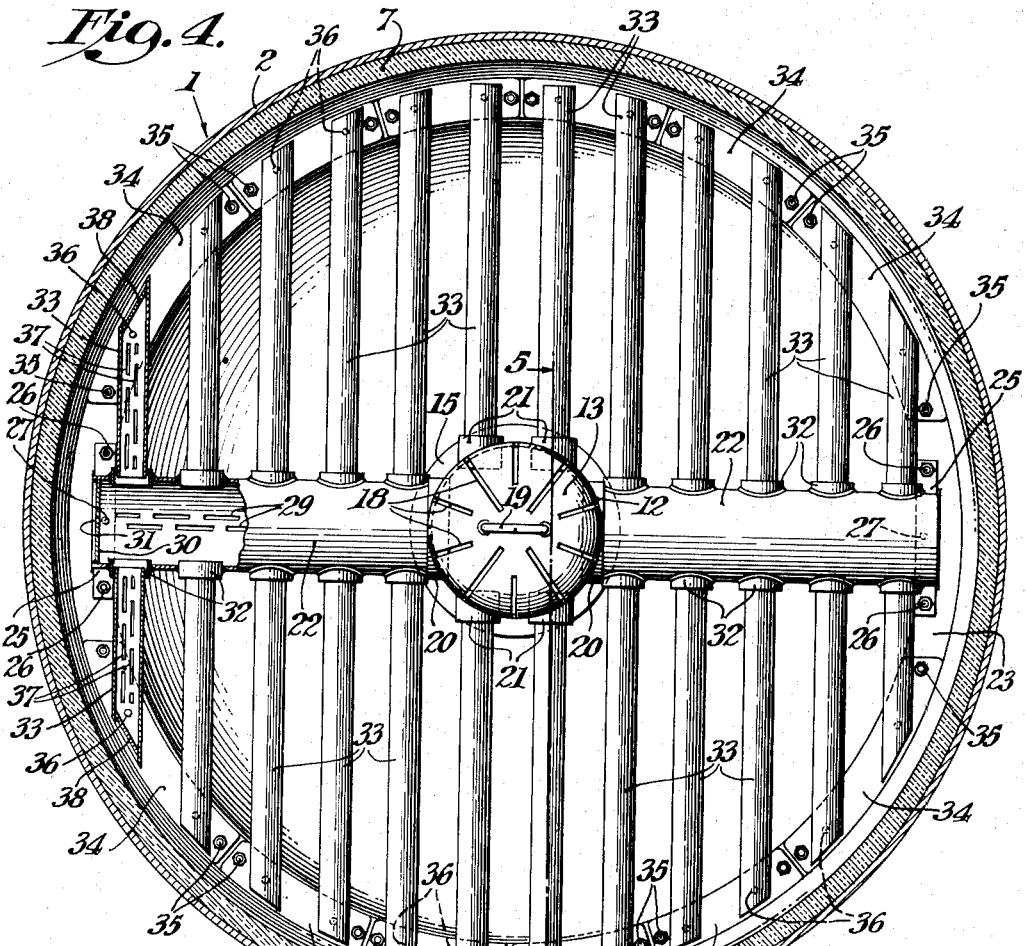
Fig. 4 is a horizontal section on the line 4—4 of Fig. 1 and upon an enlarged scale, with the aggregate omitted.
Figure 5:
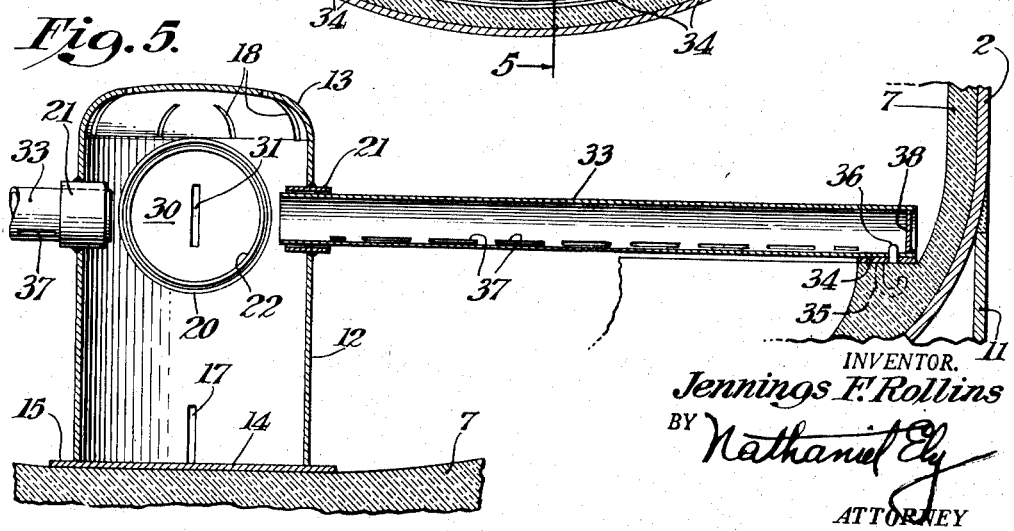
Fig. 5 is a vertical section on the line 5—5 of Fig. 4, upon an enlarged scale and with parts broken away.

According to the invention, the product vapors are collected within the lower portion of the reaction chamber and delivered to an outlet by an assembly of tubes perforated along their length to admit the vapors and all connected to said outlet. These tubes include large trunk tubes leading in opposite directions to an outlet header centrally located at the bottom of the chamber, and branch tubes leading to opposite sides of the trunk tubes. These branch tubes are evenly distributed in a horizontal plane over substantially the entire cross sectional area of the chamber. A metal shell fully lined with refractory material defines the chamber, and the tubing and header assembly is mounted upon said lining with the tubes in a position spaced above the bottom of the chamber. The said branch tubes are in transversely spaced relation, and a mass of aggregate at the bottom of the chamber embeds and covers the tubes and the header and fills the spaces beneath and around all of the tubes. The mass of catalyst rests upon this mass of aggregate and the latter transmits the catalyst load to the bottom of the chamber and distributes the load substantially uniformly over approximately the entire bottom area, thereby relieving the tubing of the catalyst burden. The tubing and header are also constructed and arranged to facilitate assembly and disassembly within the chamber. For that purpose the trunk tubes are connected to the header by slip joint connections and the branch tubes are connected to the trunk tubes by similar connections. These slip joint connections also permit free expansion of the tubes. Above the normal level of the tubes the internal diameter of the casing is increased so that when the collecting device is raised bodily above said level clearance is afforded for separation of the tubes at the slip joint connections. At the top of the chamber there is a port of sufficient size to admit any one of the parts of the collecting device.

The structure of the reactor includes a casing comprising a cylindrical shell 2 vertically disposed and having convex upper and lower ends. At the upper end of the casing there is an inlet nozzle 3 and at the lower end there is an outlet nozzle 4. At a point spaced above the lower end thereof the shell has a lateral nozzle 5 forming a manhole and normally closed by a cover 6. The entire interior of the shell, including the said nozzles and the nozzle cover 6, is lined, as at 7, with refractory material. The lining may be of a suitable cement composition such as "Insulcrete," for example. A charge delivery nozzle 8 projects downwardly through the upper nozzle 3 into the upper portion of the casing. This nozzle is closed at its lower end and provided with circumferential discharge ports 9. A detachable cover 10 for the nozzle 3 bears the nozzle 8, and the inner surface of said cover is also lined with the refractory material. An annular skirt 11 welded to the shell extends downwardly therefrom and forms a support or base for the reactor. For large scale operation the reactor may be twelve feet or more in diameter and twenty-five feet or more in height.

A device for collecting and discharging product fluid is mounted within the lower portion of the reaction chamber defined by the casing. This device includes a centrally located cylindrical header 12 vertically disposed and having a convex top 13 and a flat bottom 14 which projects edgewise beyond the cylindrical body of the header and forms a flange 15. The bottom rests upon a flat surface of the lining 7, over the shell nozzle 4, and has a discharge nozzle 16 projecting downwardly into said shell nozzle. Directly above the bottom 14, the header has vertical slots 17 spaced therearound, and the top 13 has slots 18 radiating from the center thereof. The top is also provided with a welded-on lifting loop 19. Near the top, the header has a pair of diametrically located apertures provided with welded-in collars 20. Between said collars the header has two diametrically located pairs of smaller apertures provided with welded-in collars 21.

A pair of trunk tubes or manifolds 22 extend horizontally outward from opposite sides of the header and each has its inner end extending into one of the collars 20 and forming therewith a loose slip joint connection. The lining 7 is formed to provide an annular ledge 23 surrounding the header and having a pair of diametrically located recesses or niches 24 receiving the outer ends of the respective tubes. The bottom of each niche may be provided with a metal wear strip 25 forming a rest for the tube end within the niche and secured by J-bolts 26 anchored in the lining 7. A stud 27 borne by said wear strip projects into an aperture 28 in the underside of the tube. Each tube 22 has, along the under side thereof, one or more rows of apertures or slots 29. The outer end of each tube is closed by a welded-in disk 30 having a slot 31.

Each of the tubes 22 has, along opposite sides thereof, rows of spaced apertures provided with collars 32 preferably of the same size as the collars 21 borne by the header. Branch tubes 33, much smaller than the tubes 22 extend horizontally from opposite sides of the latter and have their outer ends overlying the ledge 23 and resting upon metal wear strips 34 arranged around the chamber and secured to the ledge by J-bolts 35. Studs 36 borne by said wear strips project into apertures in the underside of the respective tubes 33. The inner ends of the tubes 33 project into the respective collars 32 and form therewith loose slip joint connections. Four of the tubes have their inner ends projecting into the collars 21 borne by the header and form therewith similar slip joint connections. Each tube 33 has along the underside thereof one or more rows of apertures or slots 37. Most of the tubes 33 are beveled at their outer ends to conform approximately to the curvature of the casing and said ends are closed by welded-in disks 38.

Within the lower portion of the chamber defined by the casing 1 there is a porous mass 39 of aggregate preferably including a lower layer of balls of refractory material, approximately one inch in diameter, an intermediate layer of balls of similar material and of smaller diameter and a top layer of screened catalyst larger than that employed in the reaction process. However, the refractory material may be of any suitable divided form. The said lower layer preferably extends from the bottom of the chamber to a level above the header 12. The material of said layer embeds the header and all of the tubes and surrounds all cross sections thereof so that the material, together with the header and tubes, completely fills the lower portion of the chamber. The mass of aggregate forms a support or foundation for a mass of catalyst 40 resting thereon and extending to a high level within the reaction chamber. A charge distributor in the form of a screen 41 rests upon the catalyst mass. This screen is formed of sections detachably connected and of a size to pass through the port at the top of the reaction chamber.

The reactor was devised more particularly for employment in a catalytic process for vapor phase desulfurization of 300 end point gasoline or natural gasoline, for examples, to increase the tetraethyl lead susceptibility of the charge. However, it may be employed for desulfurization of naphtha or other hydrocarbon charges in either vapor or liquid phase. It may also be employed advantageously in contact processes other than catalytic ones. Moreover, the utility of the invention is not limited to collection of product fluid. It may be employed to advantage to introduce the charge into a reaction chamber. In that case the charge would be distributed by the perforated tubes and passed upwardly through the aggregate mass to the overlying catalyst mass.

For desulfurization of a gasoline charge containing organic sulfur compounds the reaction chamber is charged with a suitable catalyst such as bauxite, for example, in bead, pellet or other suitable divided form. The charge, at a temperature of between 700 and 800° F. and in vapor phase is introduced through the nozzle 3, distributed by the screen 41 and passed downwardly through the porous mass of catalyst for cracking of the organic sulfur compounds and conversion thereof to hydrogen sulfide. Within the lower portion of the reaction chamber the product vapors are collected by the tubing which is distributed over the cross-sectional area of the chamber. Said vapors enter the tubes 33 and 22 through the slots at the underside thereof and are conducted by the trunk tubes to the header 12 for discharge through the nozzle 16. A portion of said vapors also enters the header directly through the slots 17 and 18. The product vapors discharged are subsequently processed to remove the hydrogen sulfide.

The mass of catalyst is borne by the mass of aggregate therebeneath and the load of both masses is transmitted to the bottom of the casing 1 and distributed substantially uniformly over the bottom so that concentrated localized strain upon the casing is avoided. The collecting device is also relieved of the catalyst burden so that necessity for massive construction of said device is avoided. Thereby great economy is effected in the construction of the device. Transfer of heat to the metal shell of the casing is also minimized due to the fact that the hot vapors and the hot masses of catalyst and aggregate contact only the refractory lining of the casing and there are no metal connections between the interior of the reaction chamber and the casing shell.

When renewal of the catalyst is required the spent catalyst may be removed through the side nozzle 5 of the casing. The collector device may then be readily serviced by entering the chamber through either the manhole afforded by the side nozzle or that afforded by the top nozzle 3 and removing sufficient aggregate to uncover the tubing and the header. Then, a hoisting cable may be anchored to the loop 19 on the header and the device hoisted bodily to raise the tubes from the supporting ledge and the niches 24. Above said ledge the increased internal diameter of the chamber affords clearance for endwise withdrawal of the tubes 33 from the trunk tubes 22 and for endwise withdrawal of the latter from the header, the slip joint connections permitting ready separation of all of said parts. Some of the parts may be passed out individually through the nozzle 5 and any one of the parts may be withdrawn through the larger nozzle 3. Obviously, assembly of the parts is also facilitated. When the header is suspended in an elevated position the tubes may be readily manipulated to make their slip joint connections. In order to facilitate manipulation of the trunk tubes in assembly and disassembly and in order also to provide clearance for longitudinal expansion thereof in service the supporting collars 20 are cut back at opposite sides thereof, as at 42, to avoid contact of the adjacent collars 32 therewith.

It is, of course to be understood that the present disclosure of my invention is merely illustrative and in nowise limiting and that the invention comprehends such modifications and adaptations as will come within the scope of the following claims.

I claim:
1. Apparatus for conducting a contact process including a casing forming a closed chamber to contain a mass of divided solid contact material, said casing having a central port at the bottom thereof and an opening spaced above the bottom; and means for passing fluid through said mass including a conduit communicating with the upper part of the chamber, an upwardly removable header disposed centrally within the lower portion of said chamber and having a hollow body portion larger than said bottom port and a reduced tubular spout-like portion extending downwardly from the center of the bottom of said body portion into said port, the body portion resting upon the bottom of the chamber around said port, pipes extending laterally outward from the body portion of the header, said pipes being apertured therealong for passage of fluid, slip-joint connections between said pipes and the header body permitting expansion and contraction of the pipes under temperature changes and also permitting free outward withdrawal of the pipes from the header, and pipe-supporting means spaced laterally outwardly from the header and upon which the pipes removably rest, said slip-joint connections and said pipe-supporting means being disposed to support the pipes spaced above the bottom of the chamber, and said casing opening being of a size to permit passage of the header therethrough after withdrawal of the pipes from the header.

2. The apparatus of claim 1 wherein said casing opening is centrally located at the top of the casing and said header has an anchorage for hoisting means, whereby after withdrawal of said pipes from the header the latter may be hoisted out of the chamber through said opening.

JENNINGS F. ROLLINS.

References Cited in the file of this patent

UNITED STATES PATENTS

| Number | Name | Date |
|---|---|---|
| 1,233,016 | Bartlett | July 10, 1917 |
| 2,431,803 | Guyer | Dec. 2, 1947 |